UNITED STATES PATENT OFFICE.

CLAUS A. SPRECKELS AND CHARLES A. KERN, OF NEW YORK, N. Y., ASSIGNORS TO FEDERAL SUGAR REFINING COMPANY, OF JERSEY CITY, NEW JERSEY, A CORPORATION OF NEW JERSEY.

COMPOSITION FOR CLEANSING SUGAR AND PROCESS OF MAKING SAME.

No. 799,876.        Specification of Letters Patent.        Patented Sept. 19, 1905.

Application filed November 19, 1901. Serial No. 82,825.

*To all whom it may concern:*

Be it known that we, CLAUS A. SPRECKELS and CHARLES A. KERN, citizens of the United States, and residents of the borough of Manhattan, city and State of New York, have invented certain new and useful Improvements in Compositions for Cleansing Sugar and Processes of Making Same, of which the following is a full and true description.

The object of this invention is to produce a composition which when mixed with sugar, sugar-liquor, or sugar-bearing material will so thoroughly combine with and act upon the impurities contained in the material treated as to absorb out and carry with it when removed from the treated mass nearly all of said impurities without injuriously affecting the sugar.

In our Patent No. 695,150, dated April 22, 1902, we have described and claimed generically the process of purifying sugar or sugar solutions by the employment of sulfonated or sulfo-oleaginous defecating or cleansing agents.

The present invention relates to a form of sulfonated or sulfo-oleaginous defecating or cleansing agent and to a process for producing the same.

As an example of the way in which sulfonated or sulfo-oleaginous cleansing or purifying liquids may be prepared for use we have stated in our said patent as follows: We mix sulfuric acid, preferably of 1.835 specific gravity, (66° Baumé,) or a mixture of acids containing sulfuric acid in the proportion of, say, fifty parts, by weight, of acid with one hundred parts, by weight, of one or more bodies, of which resinous bodies, fats, fatty oils, and fatty acids and essential oils are examples. The sulfuric acid is added to the body gradually or at all events under such conditions that a low temperature will be maintained, and the mixture is allowed to stand for a few hours.

Maintaining a low temperature is essential to the production of the peculiar cleansing body herein claimed, for if the body was oxidized, as by the use of a strong or fuming acid or a high temperature was allowed, a tarry body or pasty mass would be produced, which would not have the required affinity or absorbent property for sugar impurities.

Any excess of acid is removed or neutralized either by the addition of an alkali or by the addition of water and gravital separation. The proportion and strength of acid above suggested may be used in sulfonating each and every one of the substances hereinafter mentioned; but in the case of essential oils, such as turpentine, it will be preferable to considerably increase the proportion of the oil to the sulfuric acid, even to the extent of doubling the same or more. The proportion and strength of acid may of course be varied in well-known ways, it being borne in mind that the result is that the body when acted upon by the sulfuric acid and in the condition in which it is to be used will not contain sulfuric acid in any amount injurious to the sugar and will have an affinity or absorbent property for the impurities, including invert sugar, greater than the adherence of such impurities to the sugar itself.

When acting on a resinous body, we recommend to proceed as follows: Take two parts of a resinous body, resin-oil being an example, and add while stirring the oil one part of sulfuric acid, preferably mixing the acid with the oil gradually and at all events under such conditions that a low temperature will be maintained. After the incorporation of the acid allow the mixture to stand for a few hours and then preferably remove or neutralize the excess of acid in the mixture. For this purpose we may neutralize the mixture by the addition of an alkali or mixture of alkalies, preferably carbonate of soda, caustic soda, carbonate of potash, caustic potash, or mixtures thereof. The addition of alkali to the sulfonated product may be in quantity sufficient to neutralize only the free sulfuric acid remaining, the acid being injurious to sugar, or it may be in such quantity to completely neutralize also the sulfonic acids. The salts of the sulfonic acid formed by our process under these circumstances are as applicable for our purpose as the acids themselves. When not neutralizing by the use of alkali, we proceed as follows: Add water about equal to the amount of oil in the original mixture and mix thoroughly. On standing the mixture separates into two layers, the upper fluid layer being the material in course of treatment and the lower consisting of water containing the surplus acid and other useless products, and we leave the mixture standing for several hours in a vessel properly arranged and then draw off the water containing superfluous acid, &c. To the mixture obtained by the addition of alkalies, as above described, or by the addition of water, as above described, add a solution of common salt and water to free the mixture from any remaining acid or water or excess of alkali when used. After each addition of salt and water we allow the mixture to settle and draw off the saline solution. The sulfonated body with the excess of acid in the mixture removed or neutralized by any suitable method results in a neutralized sulfonated body. When the mixture is practically free from water or from excess of alkali when used, we may add thereto kerosene-oil or petroleum-oil or other hydrocarbon oil or a mixture containing hydrocarbon oil. The said sulfonated body is soluble in amyl and ethyl alcohols and in hydrocarbon oils, especially kerosene-oils.

A cleansing or defecating liquor of the character hereinbefore specified and mixed with a considerable proportion of hydrocarbon oil or hydrocarbon-oil mixture intimately combined with a body sulfonated at a low temperature has distinct characteristics and properties for the purpose of defecating or cleansing sugar and is also, so far as we have been able to learn, a composition new in the arts. These characteristics are affinity or absorbent property for sugar impurities—such as invert sugar, caramel, and salts—superior to the adherence of such impurities to sugar itself; freedom from sulfuric acid in an amount injurious to the sugar; the body is not oxidized, owing to maintaining a low temperature in its production; and it mixes readily with hydrocarbon oil, such as petroleum-oils.

When employing alkali to neutralize an acid, we have obtained good results by employing one part of caustic soda to each fifteen parts of the modified mixture. We have obtained good results by adding about fifty per cent. of kerosene-oil; but we do not state this as a fixed percentage, since it may be materially varied.
The use of an alkali above described for the purpose of neutralizing free sulfuric acid in the sulfo-oleaginous body may result, as is well understood, in the production of sulfonic-acid salts in the product; but such salts so made are included by us under the general designation of "sulfo-oleaginous cleansing or defecating liquids."

The following are bodies which we have tested and found to act in the manner described, viz: colophonium, (rosin,) rosin-oil, olive-oil, castor-oil, cotton-seed oil, cocoanut-oil, linseed-oil, rape-oil, peanut-oil, lard, tallow, cod-liver oil, fish-oil, (Menhaden-oil,) lard-oil, oleic acid, stearic acid, palmitic acid, butyric acid, oil of turpentine; but the substances above named are given as examples only of resinous, fatty, or oily bodies which may be subjected to the action of sulfuric acid to produce a sulfo-oleaginous cleansing or defecating liquid or compound of the character described.

Our invention, generically stated, includes not only defecating or cleansing liquids containing sulfo-oleaginous bodies made as aforesaid, but also defecating or cleansing liquids containing sulfo-oleaginous bodies made by the subjection of mixtures of two or more of such resinous, fatty, or oily bodies to the action of sulfuric acid. We have obtained good results from a considerable number of such mixtures, of which the following may be cited as examples: first, rosin-oil, castor-oil, and oleic acid; second, castor-oil, cotton-seed oil, and oleic acid; third, lard and rosin-oil; fourth, rosin-oil, oleic acid, and oil of turpentine; fifth, tallow and oil of turpentine.

As most of the above-enumerated bodies are known as oils and as rosin is analogous to fatty bodies for the purposes of our invention and as the fats are solid oils and as the fatty acids, as is well known, have oily or greasy characteristics and as all of the above substances are acted upon by sulfuric acid in the manner described and also when sulfated act on sugar and its impurities in analogous and equivalent ways, we hereinafter include them all under the generic term "oleaginous" bodies, and when acted on by sulfuric acid in the manner described we term the derivatives "sulfo-oleaginous" bodies. All the derivative cleansing agents mentioned are properly included also under the term "sulfonated" bodies whether properly and strictly called "oleaginous" or not. Many forms of sulfo-oleaginous bodies, especially sulfonic acids or sulfonic-acid bodies, are well known in the arts for other purposes, and hence a more particular description of the methods of producing the same is not required.

In preparing the sulfonated fluid defecating or cleansing agent constituting the subject-matter of our claims the hydrocarbon oil or mixture of hydrocarbon oil may sometimes be added before or sometimes after subjecting the bodies hereinbefore specified to the action of the acid or acid mixture. For instance, bodies containing palmitic acid, stearic acid, butyric acid or rosin may be first softened or rendered fluid by the addition of kerosene-oil.

The amount of our new defecating or cleansing liquid employed may be varied to suit the different qualities of the material being treated, enough being used, of course, to absorb out the impurities. As the liquid has no injurious effect upon the sugar, sugar-liquor, or sugar-bearing material, the quantity of the liquid may be increased as desired. The mixture or combination of sulfonated fluid defecating or cleansing agent with sugar produces an intermediate product, which constitutes the subject-matter of Letters Patent of the United States No. 703,219, granted June 24, 1902, to us.

Methods of treatment of sugar or sugar solution by the use of our new cleansing or defecating liquid are described and claimed generically in United States Letters Patent No. 698,150, granted April 22, 1902, to us, and as to different specific methods in United States Letters Patent No. 699,933, granted to us May 13, 1902, and in United States Letters Patent No. 700,099, granted to us May 13, 1902.

We have described and claimed in a subordinate patent granted March 3, 1903, as No. 722,157, sulfonated fluid defecating or cleansing agents made by treating different groups and special bodies which we have found efficient in producing the desired result.

We desire it clearly understood that while we specify sulfonated defecating or cleansing liquids, made by treating certain substances or mixtures as described, yet our invention herein claimed is not limited to the substances and mixtures specifically mentioned nor to any specific way of removing excess of acid or free acid.

We claim—

1. As a new article of manufacture, a sugar-cleansing compound, consisting of a solution in hydrocarbon oil of a sulfonated derivative of a resinous body, which derivative is soluble in ethyl and amyl alcohols, substantially as described.

2. As a new article of manufacture, a sugar-cleansing compound consisting of a solution in kerosene-oil of a sulfonated derivative of a resinous body, substantially as described.

3. As a new article of manufacture, a sugar-cleansing compound consisting of a solution in hydrocarbon oil of a sulfonated body soluble in ethyl and amyl alcohols, substantially as described.

4. As a new article of manufacture, a sugar-cleansing compound consisting of a solution in hydrocarbon oil of a sulfonated derivative of an oleaginous body, which derivative is soluble in ethyl and amyl alcohols, substantially as described.

5. As a new article of manufacture, a sugar-cleansing compound consisting of a solution in hydrocarbon oil of a sulfonated derivative of rosin-oil, which derivative is soluble in ethyl and amyl alcohols, substantially as described.

6. As a new article of manufacture, a sugar-cleansing compound consisting of a solution in kerosene-oil of a sulfonated body, substantially as described.

7. As a new article of manufacture, a sugar-cleansing compound consisting of a solution in kerosene-oil of a sulfonated derivative of an oleaginous body, substantially as described.

8. As a new article of manufacture, a sugar-cleansing compound consisting of a solution in kerosene-oil of a sulfonated derivative of rosin-oil, substantially as described.

9. The process of making a sugar-cleansing compound which consists in producing a sulfonated body which is soluble in ethyl and amyl alcohols by acting on an oleaginous body with sulfuric acid, while a low temperature is maintained, then completely separating resulting sulfonated body from the mixture, and then adding hydrocarbon oil to the separated sulfonated body, substantially as described.

10. The process of making a sugar-cleansing compound which consists in mixing an oleaginous body with sulfuric acid, while a low temperature is maintained, then completely separating resulting sulfonated body from the mixture, and then adding kerosene-oil to the separated sulfonated body, substantially as described.

11. The process of making a sugar-cleansing compound which consists in mixing a resinous body with sulfuric acid, while a low temperature is maintained, then completely separating resulting sulfonated body from the mixture, and then adding hydrocarbon oil to the separated sulfonated body, substantially as described.

12. The process of making a sugar-cleansing compound which consists in mixing rosin-oil with sulfuric acid, while a low temperature is maintained, then completely separating resulting sulfonated body from the mixture, and then adding kerosene-oil to the separated sulfonated body, substantially as described.

CLAUS A. SPRECKELS.
CHARLES A. KERN.

Witnesses:
WILLIAM W. COOK,
WILLIAM H. BERRIGAN, Jr.